(12) United States Patent
Nishii et al.

(10) Patent No.: US 11,176,408 B2
(45) Date of Patent: Nov. 16, 2021

(54) TIRE IMAGE RECOGNITION METHOD AND TIRE IMAGE RECOGNITION DEVICE

(71) Applicant: BRIDGESTONE CORPORATION, Tokyo (JP)

(72) Inventors: Masayuki Nishii, Tokyo (JP); Yasuo Oosawa, Tokyo (JP); Yasumichi Wakao, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 76 days.

(21) Appl. No.: 16/619,793

(22) PCT Filed: Aug. 7, 2018

(86) PCT No.: PCT/JP2018/029613
§ 371 (c)(1),
(2) Date: Dec. 5, 2019

(87) PCT Pub. No.: WO2019/031503
PCT Pub. Date: Feb. 14, 2019

(65) Prior Publication Data
US 2020/0125887 A1 Apr. 23, 2020

(30) Foreign Application Priority Data

Aug. 10, 2017 (JP) .............................. JP2017-156115

(51) Int. Cl.
*G06K 9/46* (2006.01)
*G06T 7/00* (2017.01)
(Continued)

(52) U.S. Cl.
CPC .......... *G06K 9/4661* (2013.01); *B60C 11/246* (2013.01); *G01M 17/027* (2013.01);
(Continued)

(58) Field of Classification Search
CPC ....... B60C 11/246; B60C 11/03; B60C 11/24; B60C 13/00; B60C 2019/006;
(Continued)

(56) References Cited

U.S. PATENT DOCUMENTS 9,798,946 B2 * 10/2017 Lee ...................... G06K 9/2081
2010/0100275 A1 * 4/2010 Mian ......................... B61L 1/20
701/31.4
(Continued)

FOREIGN PATENT DOCUMENTS

CN 105913450 A 8/2016
JP 10-255048 A 9/1998
(Continued)

OTHER PUBLICATIONS

Internal Preliminary Report on Patentability with Translation of Written Opinion of the International Searching Authority for PCT/JP2018/029613 dated Feb. 20, 2020.
(Continued)

*Primary Examiner* — Bobbak Safaipour
(74) *Attorney, Agent, or Firm* — Sughrue Mion, PLLC

(57) ABSTRACT

A method which includes obtaining a plurality of images of tires that differ from one another in either one of or both of a tire type and a tire condition, the obtained images being regarded as teacher images; converting the teacher images into a size of a predetermined number of pixels; learning by a convolutional neural network using data of the plurality of converted teacher images as learning images, and setting parameters of the convolutional neural network; obtaining a tire image of a recognition-target tire and converting the obtained tire image into a size identical to that of the teacher images; and inputting the converted tire image of the recognition-target tire to the convolutional neural network and
(Continued)

determining either one of or both of the type and the condition of the recognition-target tire.

6 Claims, 8 Drawing Sheets

(51) Int. Cl.
*G06T 3/40* (2006.01)
*G01M 17/02* (2006.01)
*B60C 11/24* (2006.01)

(52) U.S. Cl.
CPC ............... *G06T 3/40* (2013.01); *G06T 7/001* (2013.01); *G06T 2207/20081* (2013.01); *G06T 2207/20084* (2013.01); *G06T 2207/30108* (2013.01)

(58) Field of Classification Search
CPC .............. E05D 11/082; E05Y 2201/22; E05Y 2201/49; E05Y 2900/606; G01M 17/027; G01M 17/02; G06F 1/1616; G06F 1/1681; G06K 9/4661; G06K 2209/19; G06T 2207/20081; G06T 2207/20084; G06T 2207/30108; G06T 3/40; G06T 7/001; G06T 7/00; G06T 7/0004; G06N 3/0454; G06N 3/084
See application file for complete search history.

(56) References Cited

U.S. PATENT DOCUMENTS

| | | |
|---|---|---|
| 2012/0207340 A1 | 8/2012 | Bulan et al. |
| 2013/0129182 A1 | 5/2013 | Noyel |
| 2015/0227819 A1 | 8/2015 | Kimura |
| 2015/0278580 A1 | 10/2015 | Sato et al. |
| 2016/0343126 A1* | 11/2016 | Miller ............... G01B 11/22 |
| 2017/0083796 A1* | 3/2017 | Kim ............... G06K 9/00369 |

FOREIGN PATENT DOCUMENTS

| | | |
|---|---|---|
| JP | 2013-532315 A | 8/2013 |
| JP | 2015-148979 A | 8/2015 |
| JP | 2015-185034 A | 10/2015 |
| JP | 2017-129492 A | 7/2017 |
| WO | 2017096570 A1 | 6/2017 |

OTHER PUBLICATIONS

Communication dated Mar. 24, 2021 by the European Patent Office in application No. 18843613.3.
Search Report dated Feb. 5, 2021 from The State Intellectual Property Office of P.R. China in Application No. 201880048281.4.
Cui Xuehong et al., "Defect classification for tire X-ray images using convolutional neural network", Electronic Measurement Technology, 5th term vol. 40, May 31, 2017. pp. 168-173 (6 pages).
Zhang et al., "Road Crack Detection Using Deep Convolutional Neural Network",2016 IEEE International Conference on Image Processing (ICIP),IEEE, Sep. 25, 2016,pp. 3708-3712 (5 pages total).
International Search Report of PCT/JP2018/029613 dated Oct. 30, 2018.

* cited by examiner

TIRE IMAGE RECOGNITION METHOD AND TIRE IMAGE RECOGNITION DEVICE

CROSS REFERENCE TO RELATED APPLICATIONS

This application is a National Stage of International Application No. PCT/JP2018/029613 filed Aug. 7, 2018, claiming priority based on Japanese Patent Application No. 2017-156115 filed Aug. 10, 2017.

TECHNICAL FIELD

The present invention relates to a method and a device for recognizing s tire image.

BACKGROUND

There has been recommended to replace a tire with a new tire when decrease in a tread rubber due to wear, or a damage due to external wound or deterioration occurs, in order to secure a tire performance and safety. Information acquisition for determination the above-mentioned phenomenon has been made mainly through appearance observation by visual inspection.

In determination of an amount of wear, although the determination is important for the running performance and the safety performance of the tire, it is hard to say that inspection by a driver has been performed as frequently as needed on a daily basis.

Therefore, instead of visual inspection by a human, if the tire information such as the amount of wear can be recognized from images produced by a machine, such as a camera, not only labor-saving in the inspection, but also reduction in management costs can be expected.

In recent, years, the image processing technology and the image recognition technology have significantly advanced, and the study for application to the inspection of a tire, for example, capturing a tread pattern of a tire and analyzing an aspect ratio thereof and a tread groove depth to identify a tire wear amount, has started (see, for example, Patent Document 1).

CITATION DOCUMENT

Patent Document

Patent Document 1; US 2016/0343126

SUMMARY OF THE INVENTION

Technical Problem

However, there has been a problem that, in Patent Document 1, because feature amounts that are characteristic geometric information such as edges and lines of a tread pattern are set in advance with intervention of a person such as a developer, not only analysis parameters are limited to individual cases, but also it takes a lot of time to analyze large amounts of tires.

In addition, the analysis accuracy has been affected by an individual image state such as brightness, an angle, or a size of an image used.

The present invention has been made in view of the conventional problems, and aims at providing a method and a device that can easily and reliably recognize a tire type and a wear state from images of the tire.

Solution to Problem

The present invention provides a tire image recognition method, including: a step of obtaining a plurality of images of tires that differ from one another in either one of or both of a tire type and a tire condition, the obtained images being regarded as teacher images; a step of converting the respective teacher images into a size of a predetermined number of pixels; a step of learning by a convolution neural network using data of the plurality of converted teacher images as learning images, and setting parameters for the convolution neural network; a step of obtaining a tire image of a recognition-target tire and converting the obtained tire image into a size identical to that of the teacher images; and a step of inputting the converted tire image of the recognition-target tire to the convolution neural network and determining either one of or both of the tire type and the tire condition of the recognition-target tire.

Further, the present invention provides a tire image recognition device, including: a tire image capturing means that captures a plurality of teacher images and a recognition target image, the teacher images being images of tires that differ from one another in either one of or both of a tire type and a tire condition; an image data converting means that converts the teacher images and the recognition-target image into a size of a predetermined number of pixels; a feature amount extracting means that extracts feature amounts of the images converted by the image data converting means; and a determining means that compares feature amounts of the recognition target image with feature amounts of the teacher images to determine either one of or the both of the tire type and the tire condition of the target tire, in which the feature amount extracting means includes a convolution layer and a pooling layer of a convolutional neural network in which the teacher images are configured as learning images, and in which the determining means includes a fully connected layer of the convolutional neural network.

The summary of the invention does not enumerate all the features required for the present invention, and sub-combinations of these features may also become the invention.

DESCRIPTION OF EMBODIMENTS

Figure 1:
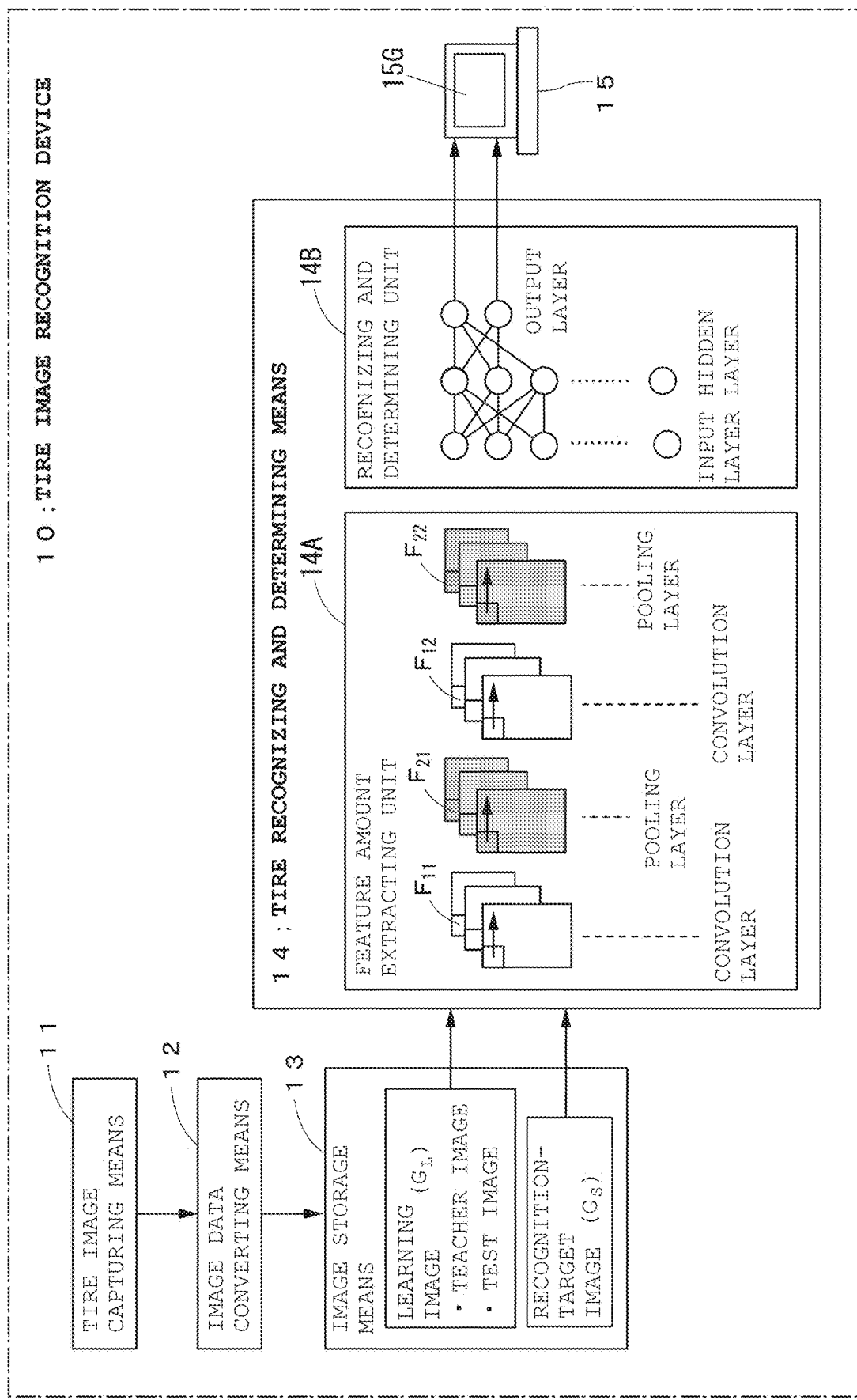
FIG. 1 is a diagram illustrating a tire image recognition device according to an embodiment of the present invention.

FIG. 1 is a functional diagram illustrating a configuration of a tire image recognition device 10.

The tire image recognition device 10 includes a tire image capturing means 11, an image data converting means 12, an image storage means 13, a tire recognizing and determining means 14, and a display means 15, and determines a wear condition of a tire from captured images of the tire.

As the tire image capturing means 11, for example, an image capturing device such as a digital camera or a smart phone is used, and the display means 15 is configured of a display or the like. Incidentally, by shooting a motion picture such as a video, still images of the motion picture may be used.

Further, each of the means, from the image data converting means 12 to the tire recognizing and determining means 14, is configured by storage devices such as a read only memory (ROM) and a random access memory (RAM) and a microcomputer program.

The tire image capturing unit 11 obtains the images by capturing images of the surface of a tire 20. More specifically, the tire image capturing unit 11 obtains a plurality of images by capturing a plurality of positions of the circumference of the tire 20 (for example, six positions).

A color tone may be either one of a gray scale and RGB, however, in the present embodiment, gray scale images were used since the tire is black color. With this, since only one channel is required, the amount of image information can be reduced. Incidentally, as image gradations, images obtained by normalizing the gray scale 225 gradations in the range of 0-1 were used.

The tire image capturing means 11 captures a plurality of reference tires, which differ in wear amounts from each other, for obtaining learning data for a convolutional neural network and a recognition-target tire for recognizing and determining the wear amount.

In the present embodiment, the number of images of the reference tire was 6 sheets, and the number of images of the recognition-target tire was 2 sheets.

Further, sizes and the number of pixels of the images are not particularly limited, however, in the present embodiment, the size of the captured images was set to 480×640 pixels. Though an image-capturing range is also not particularly limited, it is desirable that any of parts of the tread is captured in the entire image. If an object, such as scenery, a vehicle and the like other than the tire 20, has been captured in the image, it is desirable to extract the tire part and make it as a new tire image.

The image data converting means 12 converts the captured images into images of a predetermined size.

Figure 2:
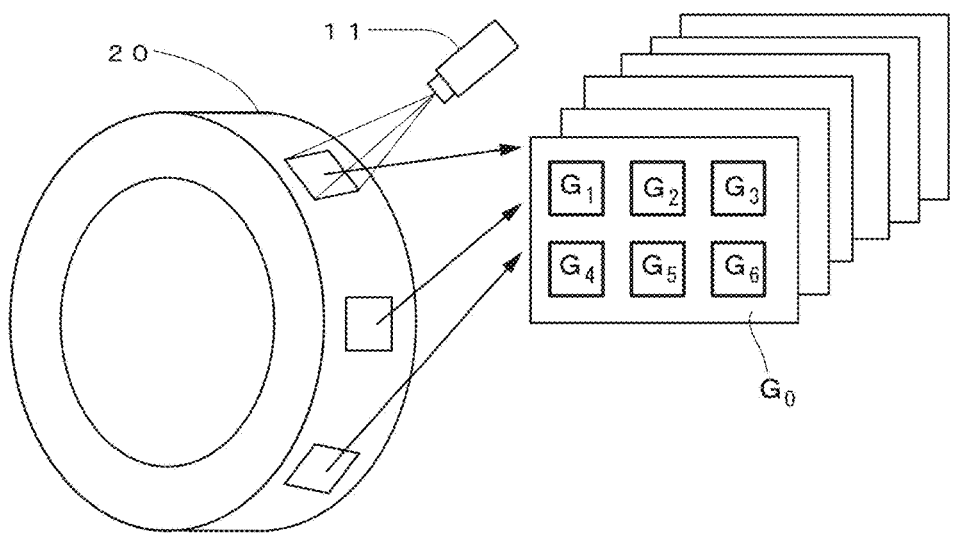
FIG. 2 is a diagram illustrating a method of cutting out conversion images.

More specifically, as illustrated in FIG. 2, the image data converting means 12 cuts out, from the captured tire image $G_0$, a plurality of images $G_1$ to $G_n$ having a size smaller than that of the tire image $G_0$ within a range of rectangular or square, to obtain converted images. At this time, it is desirable that at least one minimum-period pattern constituting a tread pattern is included in each of the converted images $G_1$ to $G_n$.

In the present embodiment, the size of the tire image $G_0$ was set to 480×640 pixels and the size of the converted images $G_1$ to $G_n$ was set to 256×256 pixels, and 6 sheets of the converted images $G_1$ to $G_6$ were cut out from one tire image $G_n$. The number of the converted images thus became 36 sheets.

The image storage means 13 stores converted images $G_{L1}$ to $G_{Ln}$ of the learning data and converted images $G_{S1}$ to $G_{Sn}$ of the recognition data that were converted by the image data converting means 12. In the meantime, the converted images $G_{L1}$ to $G_{Ln}$ of the learning data are stored by being divided into teacher data $G_{L1}$ to $G_{Lm}$ for determining filters of a convolution layer and a pooling layer and parameters of a fully connected layer that are to be described later, and test data $G_{Lm+1}$ to $G_{Ln}$ for confirming a determination accuracy of the convolutional neural network. As the number m of the teacher data, it is desirable to set to two third or more of the total number n of the learning data.

In the present embodiment, the number of levels was set to 2, and the number m was set to 27. That is, 27×2 sheets out of 36×2 sheets of the learning images were made as the teacher images, and the remaining 9×2 sheets were made as the test images.

The tire recognizing and determining means 14 includes a feature amount extracting unit 14 and a recognizing and determining unit 14B.

The feature amount extracting unit 14A includes a convolution layer having a convolution filter $F_1$ (in this case, $F_{11}$, $F_{12}$) and a pooling layer having a rectangular filter $F_1$ (in this case, $F_{21}$, $F_{22}$). The feature amount extracting unit 14A extracts, from the converted images $G_S$ ($G_{S1}$ to $G_{Sn}$) of the recognition data converted by the image data converting means 12, feature amounts of the recognition-target image that are images of the tire to be a recognition-target, and thereafter, develops the value of each of the pixels into one dimension and sends them to the recognizing and determining unit 14B.

The recognizing and determining unit 14B includes three fully connected layers of input layers, hidden layers and output layers. The recognizing and determining unit 14B compares the feature amounts of the recognition-target image with the feature amounts of the teacher images, recognizes and determines a wear condition of the recognition-target tire, and outputs, in the form of "probability", determination results from the output layers to the display unit 15.

Each of the fully connected layers is configured by a plurality of units (referred to "neuron") shown by circles in FIG. 1, each having a certain function, and connected with all the units of a preceding fully connected layer. The number of units of the output layers is equal to the number of levels of the wear state.

Here, the number of levels of the wear condition was set to two levels of a new product (wear amount 0 mm) and a large wear amount (wear amount 11 mm).

In the meantime, the number of the fully connected layers may be two layers or four layers or more.

Also, parameters (weights) for connecting the convolution filters $F_{11}$, $F_{12}$ with the rectangular filters $F_{21}$, $F_{22}$ and for connecting mutual units of the fully connected layers can be obtained by deep learning using the teacher data $G_{L1}$ to $G_{Lk}$.

The detail of the convolutional neural network and the deep learning will be described later.

The display means 15 displays the determination results of the tire recognizing and determining means 14 in a display screen 15G.

Next, an explanation is given as to the convolutional neural network.

The convolutional neural network is a feed-forward type neural network formed of a combination of the convolution layer that outputs feature images by performing convolution processing using filters to the input images and the pooling layer that improves the recognition ability with respect to a positional change by lowering a positional sensitivity of the extracted features In the convolutional neural network, after repeating the convolution layer and the pooling layer for several times; the fully connected layer is arranged. In the meantime, the convolution layer and the pooling layer are not necessarily be a pair, a combination of the convolution layer—the convolution layer—the pooling layer may be employed, for example.

The convolution layer is a layer for filtering (convoluting) the input images and in order to precisely grasp the features of the input images, it is desirable to use a plurality of filters.

The filter for convolution is for weighting each pixel value included in the area of a moderate size and adding them together, and may be expressed by a four-dimensional tensor.

On the other hand, the pooling layer shifts the rectangle filter within the input image, takes out a maximum value in the rectangular and outputs a new image (MAX pooling) so as to lower the positional sensitivity of the extracted features. Incidentally, an average value pooling may be performed for averaging the values in the rectangular.

Next, an explanation is given as to the operation of the convolutional layer. The explanation is given, taking as an example, operations up to the process in which the recognition-target image $G_k$ is convolution-processed by the first convolution layer to obtain the first convolution image $G_k$ ($F_{11}$).

As the convolution filter $F_{11}$, a square filter having a size of p×p is generally used. The size of the square of the convolution filter $F_{11}$ corresponds to the pixels of the recognition-target image $G_k$, and numbers (filter values) $a_{1,1} \sim a_{p,p}$ in the square are parameters that can be updated by learning. That is, the parameters $a_{1,1} \sim a_{p,p}$ are updated so as to be able to extract the feature amounts of the images, in the learning process.

Figure 3A:
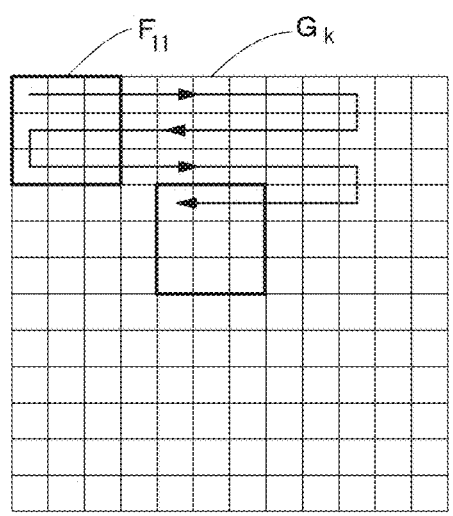
FIGS. 3(a) and 3(b) are diagrams for explaining operations of a convolution layer.
Figure 3B:
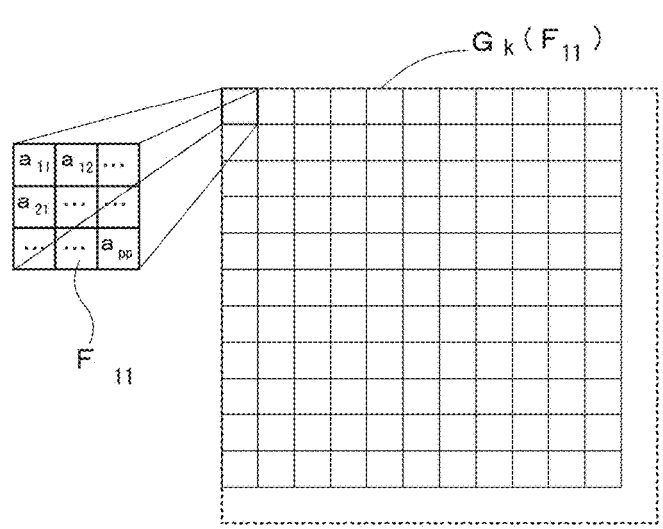

As illustrated in FIGS. 3(a) and 3(b), a first convolution image $G_k$ ($F_{11}$) is obtained by filtering, using the convolution filter $F_{11}$ with a predetermined slide width, the recognition-target image $G_k$ that is the input image. The pixel value of the first convolution image $G_k$($F_{11}$) is given by an inner product of the filter value and the pixel value of the recognition-target image $G_k$ in the square p×p, that has been filtered by the convolution filter $F_{11}$. In the meantime, due to the convolution process mentioned above, the size of the first convolution image $G_k$ ($F_{11}$) becomes smaller than the size of the recognition-target image $G_k$.

Incidentally, the operation for obtaining, using the convolution filter $F_{12}$, a second convolution image $G_k$ ($F_{12}$) from a second pooling image $G_k$ ($F_{21}$) to be described later is similar to the above-described operation.

As the convolution filters $F_{11}$ and $F_{12}$, a horizontal direction differential filter for detecting an edge in the horizontal direction or a vertical direction differential filter for detecting an edge in the vertical direction or the like is used.

Next, an explanation is given as to the operation of the pooling layer, taking as an example, operations up to the process in which the first convolution image $G_k$ ($F_{11}$) is pooling-processed by the first pooling layer to obtain the first pooling image which is the output image.

Figure 4:
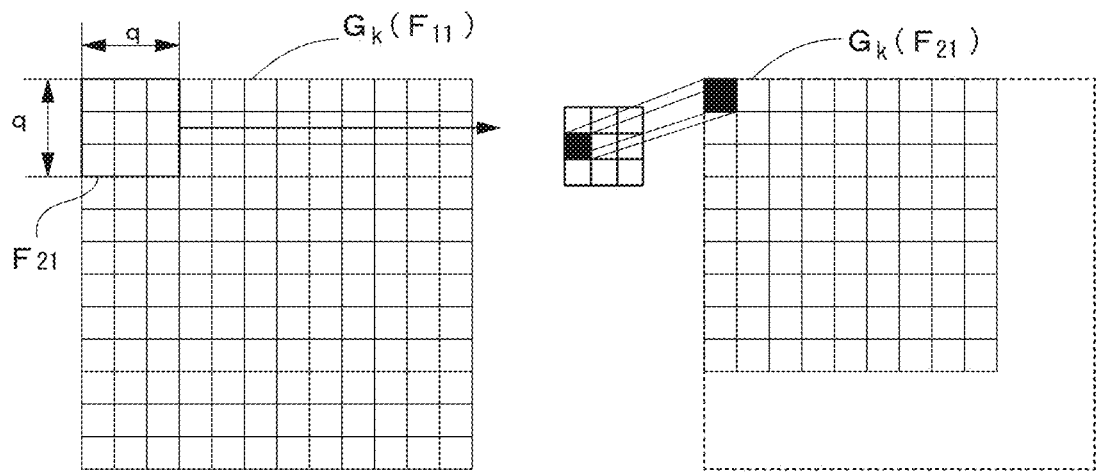
FIG. 4 is a diagram for explaining operations of a pooling layer.

In the present embodiment, as illustrated in FIG. 4, the MAX pooling was performed in which the q×q rectangular filter $F_{21}$ is shifted, by a predetermined slide width, within the first convolution image $G_k$ ($F_{11}$) which is the input image, a maximum value is taken out from among the pixel values of the first convolution image $G_k$ ($F_{11}$) in the q×q square, which has been filtered by the convolution filter $F_{21}$, and the first pooling image $G_k$ ($F_{21}$), which is a new image, is output. Also in the pooling process, the size of the first pooling image $G_k$ ($F_{21}$) becomes smaller than the size of the first convolution image $G_k$ ($F_{11}$).

The operation for obtaining, using the rectangular filter $F_{22}$, a second pooling image $G_k$ ($F_{22}$) from the second convolution image $G_k$ ($F_{12}$) is similar to the above-described operation.

Incidentally, the parameters to be updated in the learning process do not exist in the pooling process.

The fully connected layer is a neural network having input layers, hidden layers and output layers, each of these layers being configured of a plurality of units, and performs a pattern classification of the second pooling image $G_k$ ($F_{22}$), which is a two-dimensional image and which has been converted into one-dimensional vector against the input data.

Figure 5:
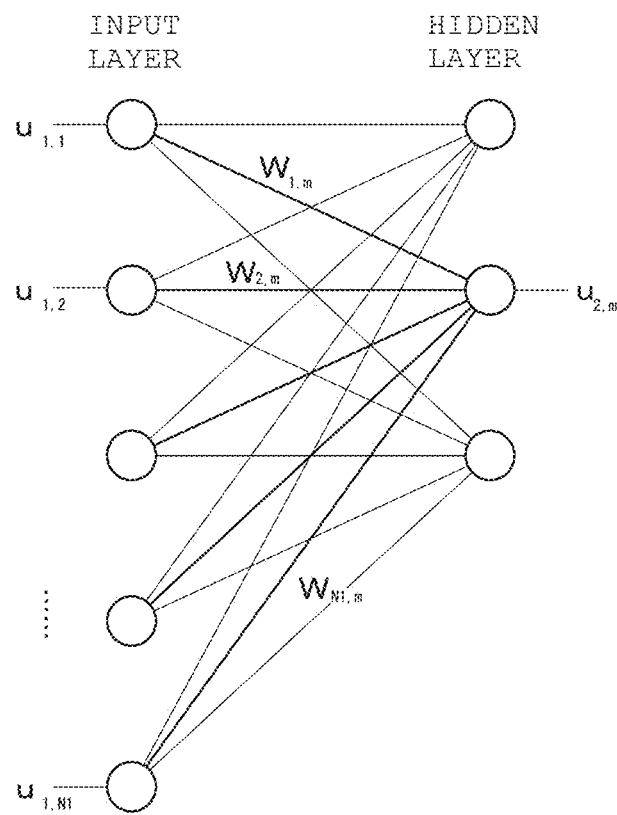
FIG. 5 is a diagram for explaining operations of a fully connected layer.

As illustrated in FIG. 5, each unit of the fully connected layer indicated by the white circle in FIG. 5 is connected with all the units of a preceding layer and a next layer by parameters that can be updated by learning.

If the number of units of the input layer and the number of units of the hidden layer are $N_1$, $N_2$, respectively, the weight that is a parameter for connecting an m-th (m=1 to $N_2$) unit of the input layer from the top with an n-th unit of the hidden layer from the top is $W_{m,n}$, and the value of each unit of the input layer is $u_{1,k}$ (k=1~$N_1$), then the input value $u_{2,m}$ to the n-th unit of the hidden layer from the top becomes $u_{2,m}=W_{1,m} \times u_{1,1} + W_{2,m} \times u_{1,2} + \ldots + W_{Ni,m} \times u_{1,N1}$. Actually, a bias $b_{2,n}$ is added to the input value $u_{2,m}$. The bias $b_{2,n}$ is the parameter that can also be updated by learning.

In the neural network, by outputting, through an activation function, the input value $u_{2,m}$ obtained in this way, the non-linearity is enhanced and the determination accuracy of the classification is improved.

The same applies to a case where a plurality of hidden layers exist, and to the relationship between the hidden layer and the output layer.

As the activation function, tanh, the Sigmoid function or the like is used, however, in the present embodiment, the Rectified Linear Unit (ReLU) function was used, which is faster and higher in performance than tanh.

Incidentally, in the output layer, the Softmax function is used as the activation function.

The Softmax function is a special activation function which is used only for the output layer and which converts the combination of the output values of the output layers into probability. Namely, it converts the output values of the output layers so that the output values become 0-1, and the total sum of the output values becomes 1 (100%).

Next, an explanation is given as to a method for self-updating, using teacher images, parameters such as the filter values $a_{1,1} \sim a_{p,p}$ and the weight $W_{m,n}$ and so on.

First, a difference between output values of "correct answer" with respect to output values of the respective levels and output values obtained by inputting the teacher images is digitized by a loss function. In the present embodiment, since the teacher images are 27×2 sheets, the parameters are updated so that a sum of the errors occurring at the time when data of 54 sheets are passed through the convolutional network becomes the minimum. In the present embodiment, a cross-entropy loss function was used as the loss function.

Further, in the present embodiment, as a method for reducing the error, the stochastic gradient descent method (SGD) was used, and an algorithm of the back propagation was used for modifying a gradient of the loss function.

The stochastic gradient descent method extracts only a small number of samples in mini batch units from among all the data, and updates the parameters while regarding these samples as all the data.

Further, in the back propagation, by sequentially obtaining the gradient from the output to the input rather than computing the gradient directly, the gradient can be obtained at a high speed.

Incidentally, in a case where the number of data is large, if the technique of Dropout, in which the calculation is performed assuming as if a part of the units is not existing, is used when calculating the fully connected layer, over-training can be prevented.

Further, the number of learning is not particularly limited, however, it is desirable to perform at least ten times. If the learning is performed correctly, the value of the loss function is reduced each time the learning is performed.

Figure 6:
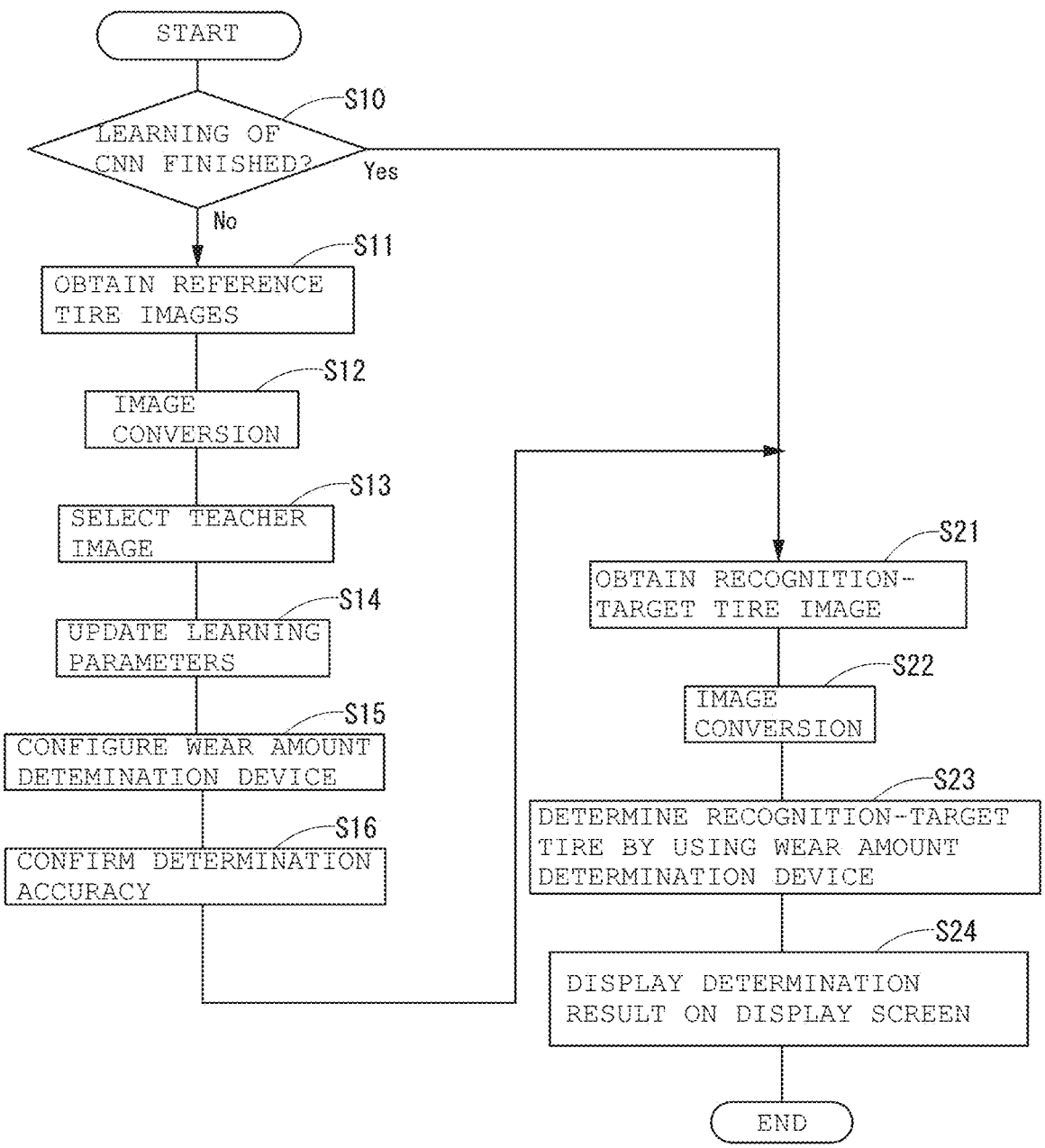
FIG. 6 is a flowchart illustrating a method for recognizing a tire image by a deep learning.
Figure 7B:
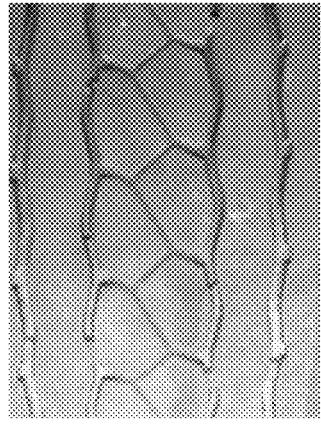
FIGS. 7(a) to 7(d) are diagrams illustrating tire images and learning images according to Example 1 (wear identification 1)
Figure 7A:
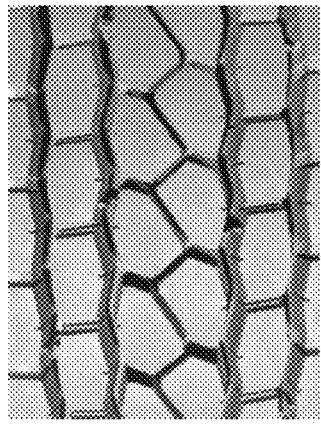
Figure 7D:
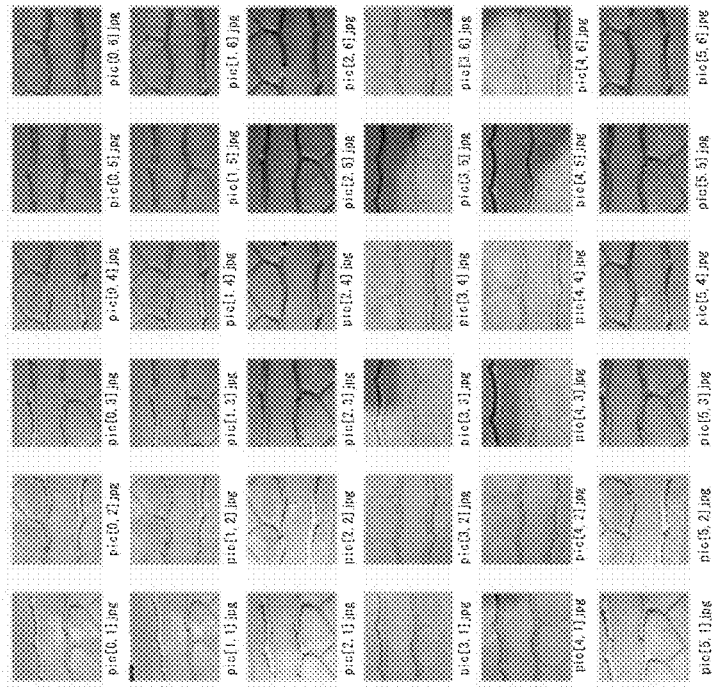
Figure 7C:
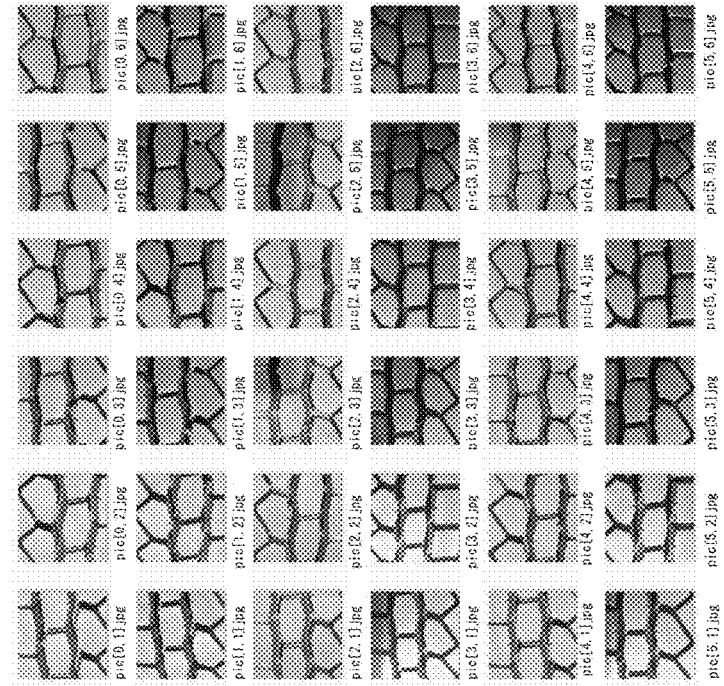

Next, an explanation is given as to a tire image recognition method by referring to the flowchart of FIG. 6.

First, confirmation is made as to whether or not the learning of the convolution neural network (CNN) has been finished (step S10).

If the learning has not been finished, the process proceeds to step S11, whereas if the learning has been finished, the process proceeds to step S21.

In step S11, surfaces of a plurality of reference tires with different wear amounts are captured to obtain images of the reference tires.

Next, after converting the obtained images of the reference tires into a plurality of images of a predetermined size (step S12), the converted images are divided into a plurality of teacher images and test images (step S13).

Then, by using these plurality of teacher images, the deep learning is performed, and filter values of the convolution layer and the pooling layer, and the parameters of CNN such as the weight of the fully connected layer are self-updated to obtain learning parameters (step S14), and with the use of these obtained learned parameters, the wear amount determining device corresponding to the tire recognizing and determining means in FIG. 1 is configured (step S15).

Then, at the time of completion of the learning, the determination accuracy of the wear amount determining device is confirmed with the use of the test images (step S16).

After confirming the determination accuracy, the process proceeds to step S21, and the surface of the tire, which is a target for recognizing and determining the amount of wear, is captured to obtain the image of the recognition-target tire.

Next, the obtained image of the recognition-target tire is converted into a plurality of images of a predetermined size (step S22).

Then, after data of these converted images is inputted to the wear amount determination device configured in step S15 and the recognition-target tire (step S23) is recognized and determined, the determination results are displayed on the display screen such as a display (step S24), and the process is terminated.

Incidentally, for recognition and determination of a next tire, it is sufficient to perform the processing of step S21 to step S24.

Although the present invention has been described with the use of the embodiment, the technical scope of the present invention is not limited to the scope described in the above embodiment. It is apparent to those skilled in the art that various modifications and improvements may be added to the above-described embodiment. It is apparent from the claims that embodiments with such modifications or improvements may also belong to the technical scope of the present invention.

For example, in the above-described embodiment, the number of levels of the wear state was set to two levels, that is a new article (wear amount 0 mm) and a large wear amount (wear amount 11 mm), however, the number of levels may be three or more levels.

For example, when it is desired to determine the amount of wear instead of the wear state, it is sufficient to lean, as teacher data, by labeling the images of the worn tires of a plurality of levels, in increments of 1~2 mm, for the number of levels of the wear amount, and determine the actual wear amount of the tire to be determined with the use of those parameters.

In the above embodiment, the tire condition was determined by the tread wear condition, however, as to whether or not there is a crack in the side tread and so on, it is possible to determine by recognizing the normal product and a defective product.

Further, when it is desired to identify a tire type from the tread pattern, it is sufficient to learn the number of tire types as labels and use the labels for determination.

It should be noted that if the outputted determination results are stored in a server or a cloud or the like, it is possible to use the outputted determination results for services such as announcement of result information to a site user or, depending on the results, recommendation of tire change.

EXAMPLE 1

An explanation is given as to identification results in a case where the tire wear amount was set to two levels, that is, a new tire and a large wear amount for tires of the same type.

Note that the identification method followed the flowchart illustrated in FIG. 6.

The specifications of the tires are shown below.

Tire 1
  Size: 245/70R19.5
  Pattern: A
  Wear amount: 0 mm (new tire)
Tire 2
Size: 245/70R19.6
  Pattern: A
  Wear amount: 11 mm
Captured Images Six pictures of a circumference length of each tire were taken randomly by a camera of a smart phone.

FIG. 7(*a*) is the image of the tire 1, and FIG. 7(*b*) is the image of the tire 2.

The sizes of the images are each 480×640 pixels.

Image Gradation

Gray scale 255 gradations were normalized in the range of 0-1.

The images after data conversion are shown in FIGS. 7(*c*) and 7(*d*).

The sizes of the images after data conversion are each 256×256 pixels.

For two types of tires, the data were distributed as follows, respectively.

Pic0,1.jpeg~Pic4,3.jpeg: teacher images 27 sheets
Pic4.4.jpeg~Pic5,6.jpeg: test images 9 sheets
Deep Learning Condition
Number of convolutions: 2
  Filter size: 16, 6, respectively
Number of poolings: 2
  Pooling area: 7, 3, respectively,
Size of fully connected layer
  First layer (input layer); 400×1<27
  Second layer (hidden layer); 50×1×27
  Third layer (output layer): 2×1×27

In the calculation from the first layer to the second layer, the dropout method was employed.

The output value was converted into the random element by the soft max function.

As the loss function, the cross entropy function was used to estimate the error with respect to the teacher data.

The filter and the weighting function were updated bye the gradient back propagation.

The learning cycle mentioned above was repeated ten times to obtain the learning parameters.

Results

Results of using the obtained learning parameters for the identification test of the test images are shown in the Table 1 below.

TABLE 1

| Number of Learning | Value of Loss Function |
| --- | --- |
| 1 | 0.430 |
| 2 | 0.017 |
| 3 | 0.028 |
| 4 | 0.0029 |
| 5 | 0.0013 |
| 6 | 0.0014 |
| 7 | 0.00069 |
| 8 | 0.00060 |
| 9 | 0.00092 |
| 10 | 0.00059 |

As shown in Table 1, it was confirmed that the error has approached zero each time the number of times of learning was increased and the learning has progressed.

Further, the determination correct answer rate was 100%.

In other words, a total of 18 sheets of 9 images of the test tire 1 and 9 images of the test tire 2 were all correctly recognized and classified.

EXAMPLE 2

Figure 8B:
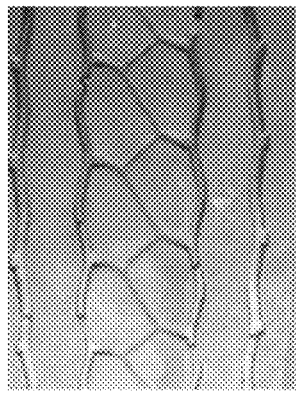
FIGS. 8(a) to 8(d) are diagrams illustrating tire images and learning images according to Example 2 (wear identification 2)
Figure 8D:
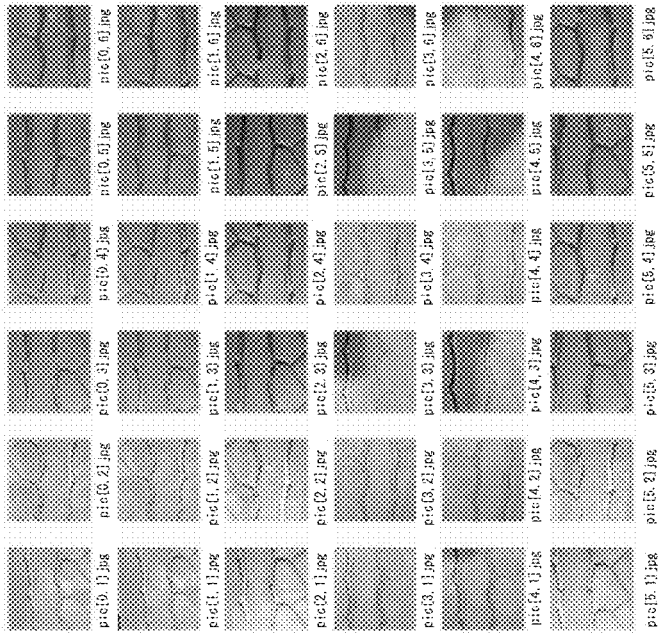
Figure 8A:
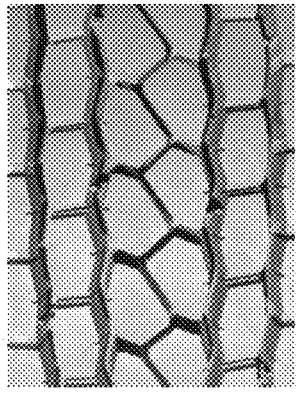
Figure 8C:
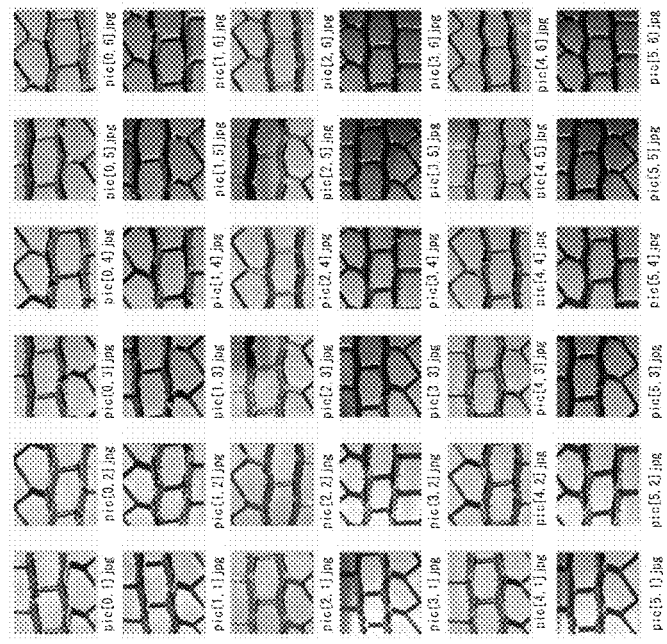

The tire 2 with the large wear amount and a tire 3 with a medium wear amount were identified.
Tire 2
  Size; 245/70R19.5
  Pattern; A
  Wear amount; 11 mm
Tire 3
  Size; 245/70R19.5
  Pattern; A
  Wear amount; 8 mm FIGS. 8(a) and (b) are captured images of the tire 2 and the tire 3, and FIGS. 8(c) and (d) are images after data conversion.

The implementation conditions conform to the Example 1.

Results

The determination correct answer rate was 96%.

In other words, out of a total 18 sheets of 9 images of the test tire 2 and 9 images of the test tire 3, 17 sheets were correctly recognized and classified.

EXAMPLE 3

The new tire 1, the tire 2 with the large wear amount and the tire 3 with the medium wear amount were identified.
Tire 1
  Size; 245/70R19.5
  Pattern: A
  Wear amount 0 mm (new tire)
Tire 2
  Size; 245/70R19.5
  Pattern; A
  Wear amount; 11 mm
Tire 3
  Size; 245/70R19.5
  Pattern; A
  Wear amount; 8 mm Incidentally, the captured images of the tire 1 to the tire 3 and, the images after data conversion are the same as those illustrated in FIGS. 7(a) to 7(d) and FIGS. 8(a) to 8(d).

The implementation conditions conform to the Example 1.

Results

The determination correct answer rate was 96%.

In other words, out of a total 27 sheets of 9 images of the test tire 1, 9 images of the test tire 2 and 9 images of the test tire 3, 26 sheets were correctly recognized and classified.

EXAMPLE 4

The tire 1 and a tire 4 of different types were identified.
Tire 1
  Size; 245/70R19.5
  Pattern; A
  Wear amount; 0 mm (new tires)
Tire 4
  Size; 205/65R15
  Pattern; B
  Wear amount; 0 mm (new tire)

Figure 9A:
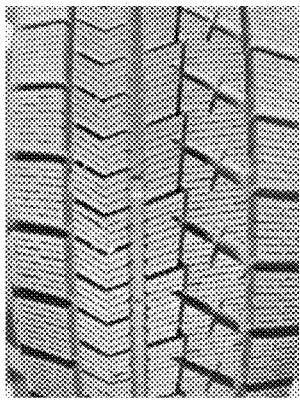
FIGS. 9(a) to 9(d) are diagrams illustrating tire images and learning images according to Example 4 (tire type identification)
Figure 9B:
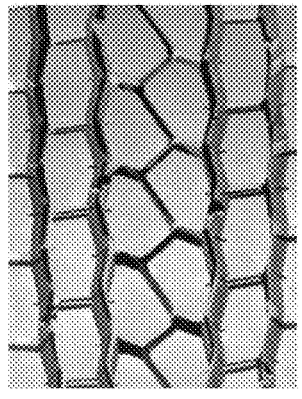
Figure 9D:
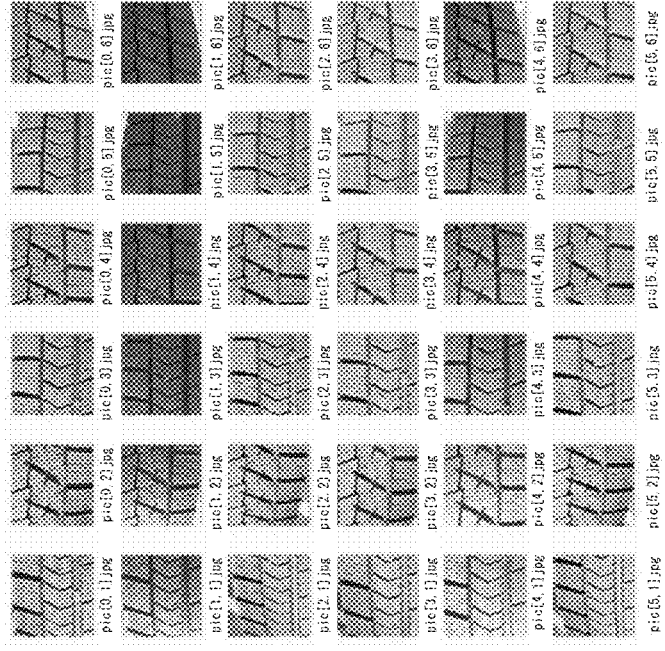
Figure 9C:
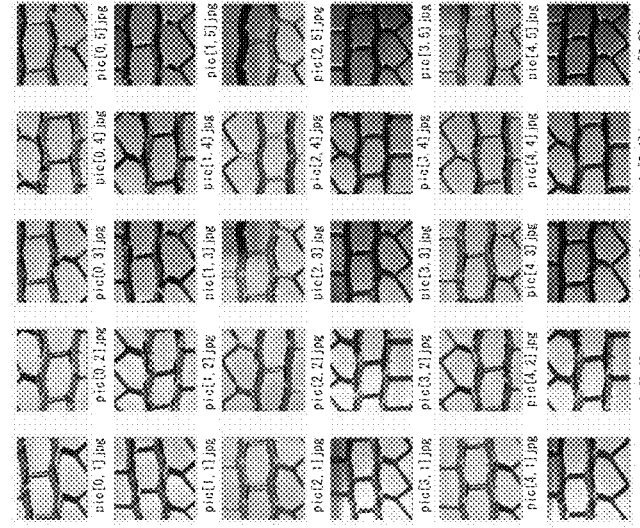

FIGS. 9(a) and 9(b) are captured images of the tire 1 and the tire 4, and FIGS. 9(c) and 9(d) are images after data conversion.

The implementation conditions conform to the Example 1.

Results

The determination correct answer rate was 100%.

In other words, a total of 18 sheets of 9 images of the test tire 1 and 9 images of the test tire 4 were all correctly recognized and classified.

EXAMPLE 5

The tire 4 and a tire 5 of different tread patterns were identified.
Tire 4
  Size; 205/65R15
  Pattern; B
  Wear amount; 0 mm (new tire)
Tires
  Size; 205/65R15
  Pattern; C
  Wear amount; 0 mm (new tire)

Figure 10A:
FIGS. 10(a) to 10(d) are diagrams illustrating examples of tire images and learning images according to Example 5 (tread pattern identification).
Figure 10B:
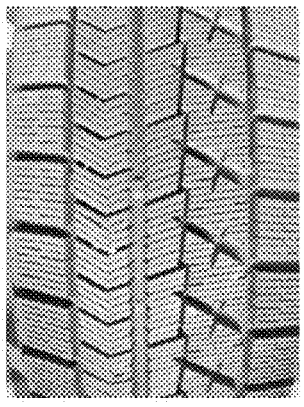
Figure 10C:
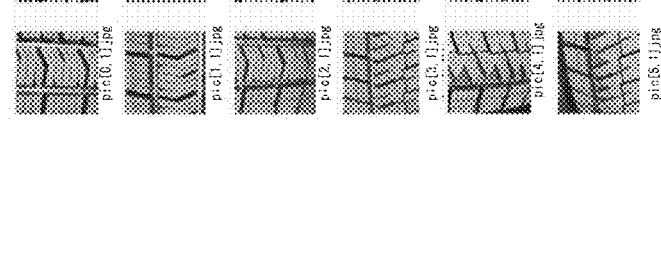
Figure 10D:
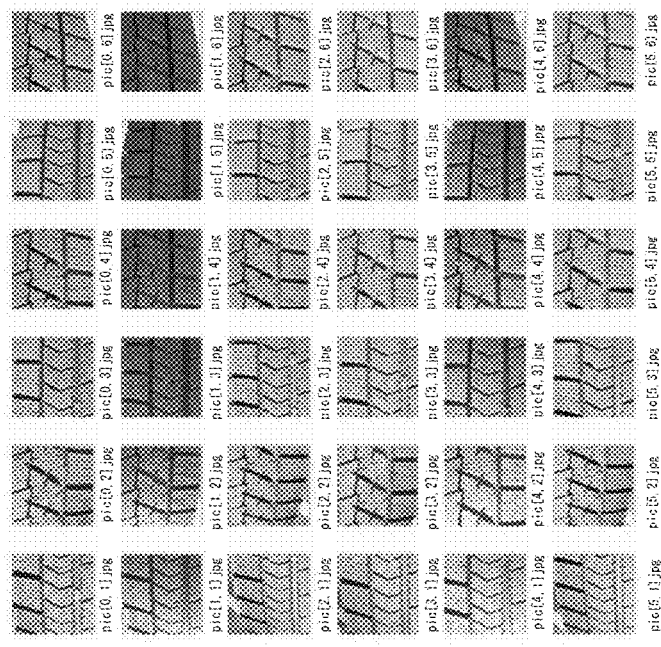

FIGS. 10(a) and 10(b) are captured images of the tire 4 and the tire 5, and FIGS. 10(c) and 10(d) are images after data conversion.

The implementation conditions regarding the images were similar to the Example 1.

Deep Learning Condition
  Number of convolutions; 4
    Filter size; 8,5,4,4, respectively
  Number of poolings; 4
    Pooling area; 5,4,4,4, respectively,
  Size of fully connected layer
    First layer (input layer); 2304×1×27
    Second layer (hidden layer); non
    Third layer (output layer); 2×1×27
  The other learning conditions conform to the Example 1.

Results

The determination correct answer rate was 100%.

In other words, a total of 18 sheets of 9 images of the test tire 4 and 9 images of the test tire 5 were all correctly recognized and classified.

COMPARATIVE EXAMPLE

The new tire 1, the tire 2 with the large wear amount and the tire 3 with the medium wear amount were identified by a tire identification device that does not have the convolution structure.

Tire 1
  Size; 245 / 70R19.5
  Pattern; A
  Wear amount; 0 mm (new tire)
Tire 2.
  Size; 245 / 70R19.5
  Pattern; A
  Wear amount; 11 mm
Tire
  Size; 245/ 70R19.5
  Pattern; A
  Wear amount; 8 mm The implementation conditions regarding the images were similar to the Example 1.

Deep learning condition
  Convolution; Non
  Size of fully connected layer
    First layer (input layer): 65536×1×27
    Second layer (hidden layer); 50×1×27
    Third layer (output layer); 2×1×27
  The other learning conditions conform to the Example 1.

Results

The determination correct answer rate was 59%.

In other words, out of a total of 27 sheets of 9 images of the test tire 1, 9 images of the test tire 2 and 9 images of the test tire 3, only 16 sheets were correctly recognized.

In summary, the present invention can be described as follows. That is, the present invention provides a tire image recognition method, including: a step of obtaining a plurality of images of tires that differ from one another in either one of or both of a tire type and a tire condition, the obtained images being regarded as teacher images; a step of converting the respective teacher images into a size of a predetermined number of pixels; a step of learning by a convolution neural network using data of the plurality of converted teacher images as learning images, and setting parameters for the convolution neural network; a step of obtaining a tire image of a recognition-target tire and converting the obtained tire image into a size identical to that of the teacher images; and a step of inputting the converted tire image of the recognition-target tire to the convolution neural network and determining either one of or both of the tire type and the tire condition of the recognition-target tire.

As such, because the convolutional neural network, which determines by the fully connected layer (conventional neural network) after extracting the feature amounts from the inputted tire image data by the convolution layer and the pooling layer, was used when recognizing the tire images, not only the calculation speed is expedited as the parameters in the neural network are greatly reduced, but also the tire information such as tire types and wear amounts can be accurately recognized and determined without setting the characteristic geometrical information such as edges and lines of the tread pattern.

Further, in the convolutional neural network, at the time of learning, the parameters of the neural network are updated and optimized so as to minimize the errors with respect to the set of the teacher image data by the back propagation with the use of the gradient descent method (GD), the stochastic gradient descent method (SGD) or the like. Thus, the accuracy in the determination of the recognition-target tire can be improved greatly.

Further, since the tire type or the tire condition is either one of a tread pattern, a tread wear amount, a damage in a bead and a clack in a side tread, tire information necessary for tire replacement can be accurately recognized and determined.

Further, since at least one pattern periodic structure is captured in the teacher images and the tire image of the recognition-target tire, the tire information can be accurately recognized and determined with less image information amount.

Further, since the teacher images and the tire image of the recognition-target tire are converted into gray scale, and gradations of the gray scale are normalized in the range of 0 to 1, the image information amount can be reduced, hence the calculation time can be shortened.

In addition, the present invention provides a tire image recognition device, including: a tire image capturing means that captures a plurality of teacher images and a recognition-target image, the teacher images being images of tires that differ from one another in either one of or both of a tire type and a tire condition: an image data converting means that converts the teacher images and the recognition-target image into a size of a predetermined number of pixels; a feature amount extracting means that extracts a feature amount of the images converted by the image data converting means; and, a determining means that compares a feature amount of the recognition-target image with a feature amount of the teacher images to determine either one of or the both of the tire type and the tire condition of the target tire, in which the feature amount extracting means includes a convolution layer and a pooling layer of a convolutional neural network in which the teacher images are configured as learning images, and in which the determining means includes a fully connected layer of the convolutional neural network.

By adopting such a configuration, it is possible to realize the tire image recognition device that can precisely recognize and determine the tire information such as tire types, wear amounts and so on.

REFERENCE SIGN LIST

10: Tire image recognition device, 11: Tire image capturing means, 12: Image data converting means 13: Image storage means, 14: Tire recognizing and determining mans, 14A: Feature amount extracting unit, 14B: Recognizing and determining unit 15: display means, 20: Tire.

The invention claimed is:

1. A tire image recognition method, comprising:

a step of obtaining a plurality of images of tires that differ from one another in either one of or both of a tire type and a tire condition, the obtained images being regarded as teacher images;

a step of cutting out, from the teacher images, a plurality of images having a size smaller than that of the teacher images and having a size of a predetermined number of pixels, and converting the cut-out images so as to obtain converted images of learning data;

a step of learning by a convolutional neural network using the converted images of learning data as learning images, and setting parameters for the convolutional neural network;

a step of obtaining a tire image of a recognition-target tire, cutting out, from the obtained tire image, a plurality of images having a size identical to that of the converted images of learning data, and converting the cut-out images so as to obtain converted images of recognition data; and a step of inputting the plurality of converted images of recognition data to the convolutional neural network and determining, for each of the plurality of inputted converted images of recognition data, either one of or both of the tire type and the tire condition of the recognition-target tire.

2. The tire image recognition method according to claim 1, wherein, the tire type or the tire condition is either one of a tread pattern, a tread wear amount and a clack in a side tread.

3. The tire image recognition method according to claim 1, wherein at least one pattern periodic structure is captured in the teacher images and the tire mage of the recognition-target tire.

4. The tire image recognition method according to claim 1, wherein, the converted images of learning data and the converted images of recognition data are converted into gray scale, and gradations of the gray scale are normalized in a range of 0 to 1.

5. A tire image recognition device, comprising:

a tire image capturing means that captures a plurality of teacher images and a recognition-target image, the teacher images being images of tires that differ from one another in either one of or both of a tire type and a tire condition; and a computer including a storage, the computer configured to cut out, from the teacher images, a plurality of images having a size smaller than that of the teacher images and having a size of a predetermined number of pixels; convert the cut-out images so as to obtain converted images of learning data; cut out, from the recognition-target image, a plurality of images having a size identical to that of the converted images of learning data; and convert the cut-out images so as to obtain converted images of recognition data;

extract feature amounts of the converted images of learning data and the converted images of recognition data; and compare feature amounts of the converted images of learning data with feature amounts the converted images of recognition data to determine either one of or the both of the tire type and the tire condition of the target tire, wherein the feature amount extracting includes a convolution layer and a pooling layer of a convolutional neural network in which the converted images of learning data are configured as learning images, and wherein the storage includes a fully connected layer of the convolutional neural network, the fully connected layer of the convolutional neural network compares the feature amounts of the converted images of the learning data with the feature amounts of the converted images of recognition data.

6. The tire image recognition method according to claim 2, wherein, the converted images of learning data and the converted images of recognition data are converted into gray scale, and gradations of the gray scale are normalized in a range of 0 to 1.

* * * * *